Patented Dec. 12, 1950

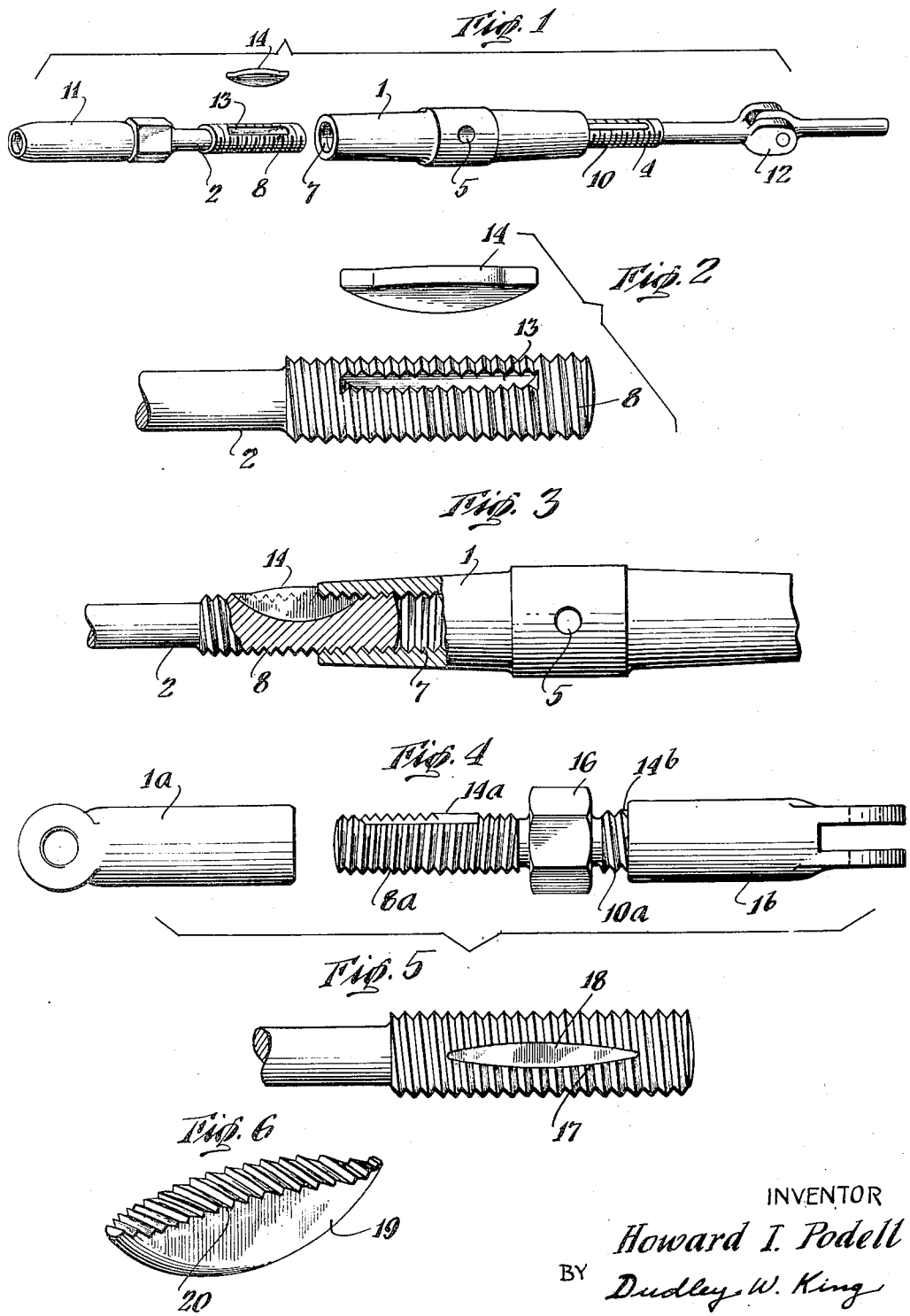

2,533,894

UNITED STATES PATENT OFFICE 2,533,894

TURNBUCKLE OR THE LIKE

Howard I. Podell, Princeton, N. J.

Application January 16, 1946, Serial No. 641,486

6 Claims. (Cl. 287—60)

The present invention pertains generally to turnbuckles and more particularly to an improved turnbuckle which minimizes the possibility of accidental loosening during usage and which may be readily adjusted to a desired new position.

Turnbuckles are utilized extensively throughout the aircraft industry where they serve to join cables and rods and provide means for taking up slack which continually develops in such rods and cables. Immediately after a new airplane has been test flown for the first time it must receive a complete and thorough recheck or overhaul; these overhauls are necessary periodically thereafter throughout the life of the airplane. An important item of these overhauls includes a careful examination and tightening of all turnbuckles, since the vibration present in aircraft is extensive the possibility of dangerous slack occurring in cables and rods is always present. It is conservatively estimated that it can require as much as two and one-half minutes to remove the locking wires from present types of turnbuckles, and it can require as much as twenty minutes to again apply the lock wire to a turnbuckle in those instances where the turnbuckle is located in a relatively inaccessible position. When it is realized that an average airplane has approximately eighty turnbuckles which must be looked after, one can appreciate that the time and work involved in examining and tightening the turnbuckles is no small matter.

Various constructions and devices have been utilized in attempting to obtain a turnbuckle that could be easily and quickly adjusted to a new position and yet which would not accidently loosen during usage. None of these attempts has resulted in producing a turnbuckle that meets all desired requirements. The aircraft industry in particular has sought, without success, to develop a satisfactory "self-locking" turnbuckle which possesses the qualities of strength, simplicity, lightness, rapid assembly and disassembly, non-fragileness, slimness, and absolutely dependable performance under widely varying temperature conditions. Previous attempts to solve the problem have resulted in a multiplicity of devices utilizing special washers, cotter pins, slotted nuts, keys and keyways, drive fits, et cetera; they have not resulted in discovering the optimum turnbuckle.

The present invention aims to overcome or minimize the above and other disadvantages and difficulties by providing an improved self-locking turnbuckle of compact and foolproof construction, comprised of a minimum number of parts, which may be easily and inexpensively manufactured and assembled.

An object of the present invention is to provide a turnbuckle of improved and relatively inexpensive construction.

Another object of the invention is to provide an improved self-locking turnbuckle.

Another object of the invention is to provide a turnbuckle which may be readily adjusted without the necessity of removing and replacing auxiliary securing means such as cotter pins, wires, keys or the like.

Still another object of the present invention is to provide a self-locking turnbuckle which may be readily manufactured from existing types of turnbuckles.

Still another object of the invention is to provide a self-locking turnbuckle which meets all of the qualities desired by the aircraft industry, as enumerated hereinabove.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is an exploded perspective view illustrating a preferred embodiment of the invention;

Fig. 2 is a fragmentary, enlarged, perspective view illustrating one member of a turnbuckle and an insert member shown in Fig. 1;

Fig. 3 is an enlarged fragmentary view, partly in section, illustrating the assembly of the turnbuckle shown in Fig. 1;

Fig. 4 is an elevational view showing the invention applied to a different type of turnbuckle.

Fig. 5 is a fragmentary, enlarged, perspective view showing a modified form of the invention; and Fig. 6 is an enlarged view illustrating a further modification of the invention.

Referring again to the drawings and more particularly to Fig. 1 thereof, there is shown a turnbuckle comprising an internally threaded sleeve or center member 1, a threaded rod or member 2 adapted to be screwed into one end of the sleeve 1, and a threaded rod or member 4 adapted to be screwed into the opposite end of the sleeve 1. The internally threaded sleeve 1 has a right hand thread 7 at one side thereof adapted to receive the right hand thread 8 on the exterior of the rod 2 which is adapted to be screwed into it. The opposite side of the internally threaded sleeve 1 has a left hand thread adapted to receive the left hand thread 10 of the member 4 which will be screwed into it. During use the threaded rods 2 and 4 will be secured at their outer ends 11 and 12 to cables, wires, or rods. Rotation of the internally threaded sleeve 1 in one direction causes both of the external threaded rod members 2 and 4 to be drawn together and rotation of the sleeve 1 in an opposite direction will cause the rods 2 and 4 to move away from each other. A hole or aperture 5 through the center of the sleeve 1 may be utilized for receiving a nail or tool to facilitate rotation of the sleeve and adjustment of the rods 2 and 4. The turnbuckle may thus be used for adjusting or regulating the lengths of cables or rods fastened to the ends 11 and 12 of the external threaded rod members 2 and 4. The parts of a turnbuckle may be made from any suitable material; frequently the sleeve member 1 will be made of brass and the rod members 2 and 4 of steel.

In instances where a turnbuckle of the type shown in Fig. 1 is installed along the length of a rod or cable, continual jarring or vibration may cause it to loosen unless some means is provided to prevent rotation of the sleeve 1 with respect to the rod members 2 and 4. Wiring or cotter keying these members together will prevent such relative motion but, as pointed out hereinabove, these expedients present numerous disadvantages. In Fig. 1, and also in the enlarged perspective view of Fig. 2, there is shown an externally threaded rod or member 2 having the customary screw thread 8 on the exterior surface thereon and provided with a recess or groove 13 in the threaded portion thereon. Preferably this groove extends longitudinally along the axis of the threaded member. It may be cut into the rod member either before or after a thread is formed on it. Since the groove 13 may be cut into the member after the threads are formed, it will be clear that it may be provided in those turnbuckle parts which are already manufactured. The depth of the groove 13 may vary, depending upon the size of the particular turnbuckle, but it preferably extends a short distance below the bottom diameter of the threads on the member or to be formed thereon, so that an insert member 14 pressed into the groove will be securely retained therein. Preferably the groove or recess has a concave cross-section (Fig. 3) so that its depth is greater at the mid-portion thereof.

Immediately above the groove or slot 13 adapted to fit into the groove is shown an insert member 14; preferably this insert member of vulcanized fiber, hard rubber, plastic or some similar material and is forced into the groove 13. If desired, a suitable adhesive may be used to assist in retaining the insert member 14 within the groove 13, or the insert may be formed from a suitable plastic material and placed in the slot while in a moldable condition, to later harden upon exposure to the atmosphere. In any event, the material utilized for the insert member 14 should be softer than the material of the sleeve member 1 and rod members 2 and 4. It is preferred that the shape of the upper surface of the insert member be longitudinally convex (see for example Fig. 2) and it is desirable that it project at least a slight distance above the root of the threads and preferably above the tops of the threads 8 and 10 formed on the rod members 2 and 4; the reason for this will be clear from the following paragraph describing the operation of the invention.

In operation, the thread on the rod member 2 screws readily into the internally threaded sleeve 1 in the usual manner until the insert member 14 reaches the threads inside the sleeve. When this condition is reached, the interior thread of the sleeve 1 will commence cutting or digging a thread into the convex exposed surface of the insert member 14. As the insert 14 continues to move within the sleeve 1 there will continue to be a thread cut along its upper surface and the material removed during formation of the threads tends to fill the clearance or spaces normally existing between the threads of the sleeve 1 and the rods 2 and 4. The insert member 14 in this manner effects an increase in the tightness of the fit between the sleeve and rod members and the tightness of this fit increases as a greater length of the insert 14 moves within the sleeve 1. The longitudinally convex shape of an insert member tends to force tightly into the thread of the sleeve member resulting in a jam or tight fit of any desired magnitude. The tightness of the fit desired with any particular type or size of turnbuckle may be obtained by suitably varying the length or width of the insert 14, the shape of the slot or groove 13, and also the material from which the insert member is made. A turnbuckle manufactured in accordance with the invention described herein is provided with an automatic self-locking or gripping feature; once the turnbuckle is screwed to a desired position, it will so remain. The members will not thereafter accidentally rotate with respect to each other and lose any particular adjustment. In the event a cable stretches during use and slackness occurs in that particular cable, the slack may be quickly and easily removed by rotating the turnbuckle sleeve 1 to cause the end members or rods 2 and 4 to move together and take up the slack; it is not necessary to first remove wires, cotter pins or the like, make the necessary adjustment, and thereafter replace them. Likewise, the turnbuckle may be as readily adjusted to lengthen a cable or rod and the self-locking or gripping feature will cause the new setting to be maintained. The present device may be readily and quickly adjusted.

Fig. 4 shows the invention applied to a slightly different type of turnbuckle. In this type the threaded rod members 8a and 10a are integral, with a nut or hexagonal portion 16 located at the mid-portion thereof for facilitating rotation. Sleeve members 1a and 1b are adapted to be screwed onto opposite ends of the threaded central rod member and to cooperate with insert members 14a and 14b in a manner similar to that described hereinabove in connection with Figs. 1, 2 and 3.

In Fig. 5 there is illustrated a modified form of the invention wherein at least one end of the groove 17 and of the insert member 18 is narrower than the remainder thereof. With this modification a gradually increasing force or locking effect is applied as a rod member and a sleeve member are screwed into engagement. This feature is advantageous in certain instances.

It may be desired, in some instances, to provide the insert member with an enlarged preformed thread on its upper convex surface adapted to cooperate with the threaded surface on the interior of a sleeve member and Fig. 6 illustrates an insert member 19 having such a threaded upper surface 20. The threads on the interior surface of a sleeve member will bite into the enlarged or heavier thread 20 on the insert member 19 and a gripping or locking action will occur similar to that described in connection with the preferred embodiment.

While the invention has been described chiefly with reference to a turnbuckle, it may also be advantageously utilized in instances where a bolt is applied in a location which does not permit the use of a lock nut. An example of such use is threading bolts or studs into an engine block. Bolts manufactured in accordance with the present invention may be screwed into position to lock any given depth, yet they may be readily removed and reinstalled without damaging or deforming the threads of either the bolt or the engine block.

It will be seen that the present invention provides a new and improved turnbuckle which allows rapid tightening or loosening thereof without the necessity of utilizing auxiliary locking or retaining means for holding the device in desired position. The device of the present invention is self-locking, compact, simple, strong and light. The construction may be manufactured at low cost and may be assembled with a minimum amount of effort. The turnbuckle is easy to adjust and operate and is fully capable of withstanding the rough usage to which it will be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a device of the class described, the combination of a pair of members threadedly secured together and adapted to be screwed along each other, one of said threaded members having a recess therein, and a non-metallic insert member in said recess having a substantially longitudinally convex upper surface projecting above the edges of the recess prior to screwing said threaded members along each other and over the insert member but adapted to be cut into by a thread upon screwing them along each other, the cutting into said insert by a thread resulting in a gripping action which minimizes unintentional disengagement of the threaded members.

2. A device of the class described comprising, in combination, an internally threaded member, an externally threaded member assembled in operation relationship with and adapted to be screwed along said first member, said externally threaded member having a recess therein with a narrowed end portion and a widened mid-portion, and a non-metallic insert member in said recess having narrowed end and widened mid-portions conforming substantially to said recess and with the upper surface thereof at said mid-portion projecting above the threaded surface and above said end portions of the insert member prior to screwing the threaded members along each other, the threads of the internally threaded member cutting into said insert member upon screwing the threaded members along each other to thereby provide a holding action which minimizes the possibility of accidental separation of the threaded members.

3. In a turnbuckle device of the class described, the combination of an internally threaded member, an externally threaded member assembled in operative relationship with and adapted to be screwed along said first member, said externally threaded member having a substantially longitudinally extending recess therein with a mid-portion of greater depth than the end portions thereof, an insert member of softer material than either of said threaded members in said recess and conforming substantially to the shape thereof, and a thread on the upper surface of said insert member having a pitch diameter adjacent each end thereof adapted to facilitate uninterrupted rotation of said internally and externally threaded members and having adjacent the mid-portion thereof a normally greater pitch diameter than that of said internally and externally threaded members, whereby the internally threaded member tends to compress said insert member adjacent its mid-portion and cause it to exert pressure along its length against adjacent threads of the internally threaded member to thereby minimize accidental rotation of said parts of said turnbuckle with respect to each other.

4. A turnbuckle including a threaded rotatable member having threads of opposite hand at opposite ends thereof, a pair of threaded members having threads of opposite hand and assembled in operative relationship with said threaded rotatable member at opopsite ends thereof, the rotatable member being adapted to be screwed along the threads of said pair of members, certain of the cooperating threads being externally disposed and others being internally disposed so as to receive said externally disposed threads, said externally threaded members each being provided with longitudinally extending relatively narrow slots, an insert member relatively softer than said threaded members lying in each of said longitudinally extending relatively narrow slots, and each of said insert members having comparatively low opposite end portions adapted to facilitate initial substantially uninterrupted relative rotation of an externally threaded and an internally threaded member and each having an intermediate outwardly disposed portion of greater exposed height than said low opposite end portions and connecting with said low end portions by outwardly disposed generally sloping portions, said insert members adapted to be forced into by the threads of a member having internally disposed threads when said rotatable member is screwed along the other threaded member and over said intermediate portion of an insert member.

5. A threaded member adapted for use in a device of the class described for retaining thereon another threaded member, comprising a member having a recess therein, and a non-metallic insert member in said recess having a substantially longitudinally convex upper surface projecting above the edges of the recess prior to screwing said threaded members along each other and over the insert member but adapted to be cut into by a thread upon screwing them along each other, the cutting into said insert by a thread resulting in a gripping action which minimizes unintentional disengagement of the threaded members.

6. An externally threaded member adapted to retain thereon an internally threaded member, said externally threaded member being provided with a longitudinally extending relatively narrow slot, an insert member relatively softer than said threaded member lying in said longitudinally extending relatively narrow slot, said insert member having comparatively low opposite end portions adapted to facilitate initial substantially uninterrupted relative rotation of the externally threaded and the internally threaded members and having an intermediate outwardly disposed portion of greater exposed height than said low opposite end portions and connecting with said low end portions by outwardly disposed generally sloping portions, said insert member adapted to be forced into by the threads of the internally threaded member when the latter member is screwed along the externally threaded member and over said intermediate portion of the insert member.

HOWARD I. PODELL.

REFERENCES CITED

The following references are of record in the file of this patent:

UNITED STATES PATENTS

| Number | Name | Date |
|---|---|---|
| 368,744 | Woodruff | Aug. 23, 1887 |
| 1,025,278 | Kirchhoff | May 7, 1912 |
| 1,772,008 | Kasper | Aug. 5, 1930 |
| 2,398,160 | Silver | Apr. 9, 1946 |

FOREIGN PATENTS

| Number | Country | Date |
|---|---|---|
| 490,680 | Great Britain | Aug. 18, 1938 |